(No Model.)
H. WECKER.
HUB ATTACHING DEVICE FOR VEHICLE AXLES.
No. 509,009. Patented Nov. 21, 1893.
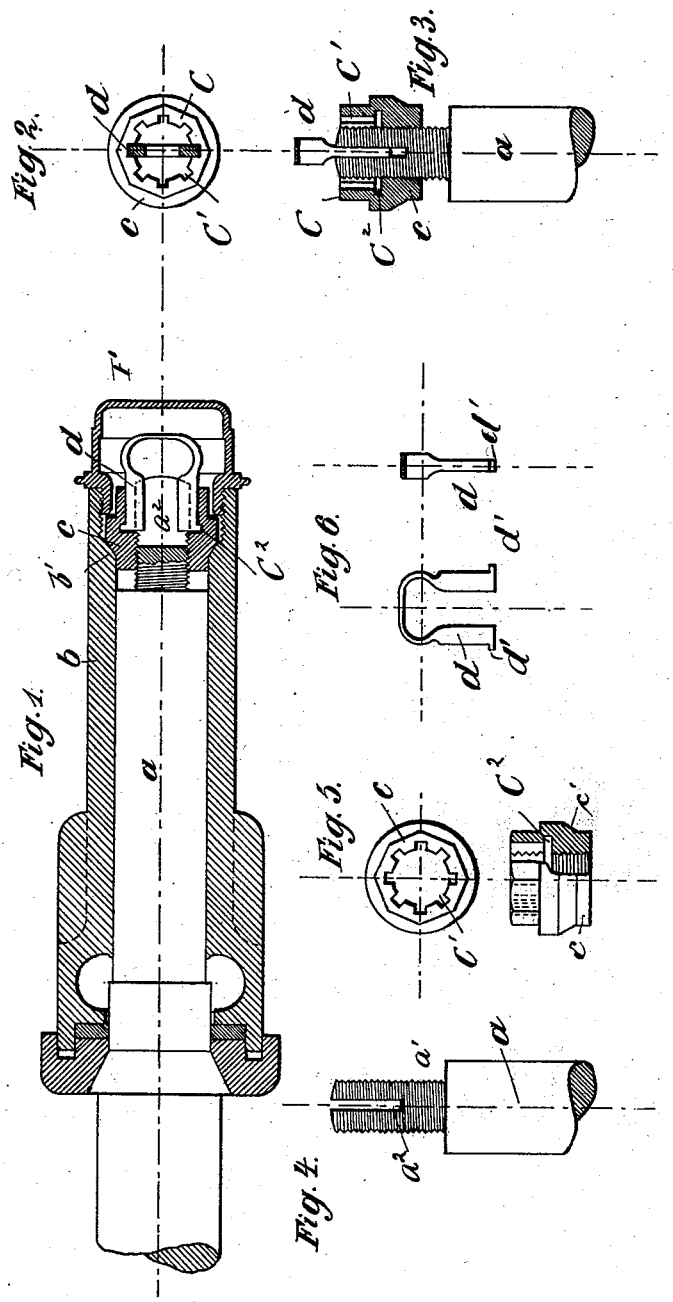
WITNESSES:
H. Billard Griffiths.
Charles Schroeder
INVENTOR
H. Wecker.
by Goepel & Raegener
ATTORNEYS.

UNITED STATES PATENT OFFICE.

HERMANN WECKER, OF OFFENBACH-ON-THE-MAIN, GERMANY.

HUB-ATTACHING DEVICE FOR VEHICLE-AXLES.

SPECIFICATION forming part of Letters Patent No. 509,009, dated November 21, 1893.

Application filed June 1, 1893. Serial No. 476,206. (No model.)

*To all whom it may concern:*

Be it known that I, HERMANN WECKER, a subject of the German Emperor, residing at Offenbach-on-the-Main, Hesse-Darmstadt, German Empire, have invented certain new and useful Improvements in Axle-Boxes, of which the following is a specification.

The object of my invention is to provide a new and improved axle box which is so constructed that it is held firmly and securely on the spindle and cannot become detached accidentally.

The invention consists in the combination of an axle spindle having its front end reduced in diameter and screw-threaded externally, which threaded part is provided with a longitudinal transverse slit, a nut screwed on said threaded part of the spindle, which nut has a series of longitudinal notches and an annular groove at the inner end of said notches, and a spring-key inserted into opposite notches and the slit in the end of the spindle.

The invention also consists of certain details of construction and combination of parts, which will be fully described hereinafter and finally pointed out in the claim.

In the accompanying drawings, Figure 1 is a vertical longitudinal sectional view of my improved axle box and the spindle on which it is applied, also the locking device. Fig. 2 is an end-view of the nut with the key in transverse section. Fig. 3 is a horizontal sectional view through the end of the spindle nut and the key. Fig. 4 is a side-view of the end of the spindle. Fig. 5 is a top-view and a side-view partially in section of the nut, and Fig. 6 is a side-view and cross-section of the spring-key.

Similar letters of reference indicate corresponding parts.

The spindle $a$ has its front end $a'$ reduced in diameter and screw-threaded, and said screw-threaded part is provided with a transverse slit $a^2$ extending from the end to a distance slightly beyond half the length of said screw-threaded part. The nut $c$ which is adapted to be screwed on the threaded end of the spindle is provided with a beveled exterior shoulder $c'$ that can rest against the bevel shoulder $b'$ of the axle box $b$. The nut is provided with a neck C at its front end, the outer surface of which neck is made polygonal and in the inner surface of said neck a series of longitudinal notches $C'$ are formed, the inner ends of which are in communication with an annular groove $C^2$ in the interior of the nut. A U-shaped spring-key $d$ has flattened shanks and an outwardly-projecting lug $d'$ at the end of each shank. The axle box $b$ is placed on the spindle, the nut is inserted, and by means of a suitable key applied on the polygonal neck C is screwed up until the bevel shoulder $C'$ rests against the bevel-shoulder $b'$. The spring-key $d$ is then inserted into the slit $a^2$ of the threaded end-part $a'$ of the spindle and at the same time its lugs $d'$ pass through two diametrically opposite notches $C'$ of the nut, which lugs when they arrive at the annular groove $C^2$ of the nut snap outward, thereby preventing the withdrawal of the key. As the key is partially in the slit $a^2$ of the threaded part $a'$ of the spindle and partially in the two opposite notches $C'$ of the nut it prevents said nut from turning or unscrewing and thus holds the box in proper place. The key cannot be withdrawn readily or drop out accidentally, as the spring-tension holds it in place and its lugs $d'$ are in the annular groove $C^2$ of the nut. To remove the axle box, the shanks of the keys must be pressed toward each other so as to disengage their lugs $d'$ from the annular groove $C^2$ whereupon the key can be withdrawn and the nut unscrewed in the usual manner. A dust cap F is screwed into the front end of the axle box.

Having thus described my invention, I claim as new and desire to secure by Letters Patent—

The combination, with an axle-spindle having its front end screw-threaded on the spindle, a nut screwed on the threaded end of the spindle, which nut is provided with a series of longitudinal notches and with an annular groove at the inner end of said notches, a U-shaped spring-key having outwardly-projecting lugs at the ends of the shank, which spring-key is passed into two opposite notches of the nut and in the slit of the threaded part of the axle-spindle, the lugs passing into the annular groove of the nut, substantially as set forth.

In witness whereof I have hereunto set my hand in presence of two witnesses.

HERMANN WECKER.

Witnesses:
 FRANK H. MASON,
 CARL SCHÖMBS.